United States Patent [19]
Yamamoto et al.

[11] Patent Number: 5,159,664
[45] Date of Patent: Oct. 27, 1992

[54] GRAPHIC DISPLAY APPARATUS

[75] Inventors: Tetsuya Yamamoto; Goro Suzuki; Susumu Sugawara, all of Hitachi; Nobuhiro Hamada, Hitachioota; Ko Miyazaki, Kodaira; Tsuyoshi Takahashi, Kokubunji; Susumu Tamura, Takasaki; Mikihiko Motoki, Isesaki, all of Japan

[73] Assignees: Hitachi Ltd.; Hitachi Microcomputer Engineering, Ltd., Tokyo, Japan

[21] Appl. No.: 671,652

[22] Filed: Mar. 19, 1991

Related U.S. Application Data

[63] Continuation of Ser. No. 375,876, Jul. 6, 1989, abandoned.

[30] Foreign Application Priority Data

Jul. 6, 1988 [JP] Japan .................................. 63-166761
Sep. 6, 1988 [JP] Japan .................................. 63-224128

[51] Int. Cl.$^5$ ............................................ G06F 15/60
[52] U.S. Cl. .................................... 395/133; 395/141
[58] Field of Search ..................... 364/518, 521, 523; 395/120, 128, 133, 141-143

[56] References Cited

U.S. PATENT DOCUMENTS 3,930,237 12/1975 Villers .......................... 340/172.5 X
4,665,555  5/1987 Alker et al. ........................... 382/41
4,868,766  9/1989 Oosterholt ........................ 364/521 X

OTHER PUBLICATIONS

VLSI "Silicon Compilation and the Art of Automatic Microchip Design," Ronald F. Ayres, Prentice-Hall, Inc., 1983, pp. 26-27.
"Undoing of Inputted Command" in Manual of HITAC Programming Supported Editor ASPEN, p. 92.
*Easy CAD Version 1.08,* Evolution Computing, Jun. 1987, pp. 6, 15-22, 177-189 and 203-232.

*Primary Examiner*—Gary V. Harkcom
*Assistant Examiner*—Michael A. Jaffe
*Attorney, Agent, or Firm*—Antonelli, Terry, Stout & Kraus

[57] ABSTRACT

A graphic processor comprises an input device for inputting a command from an operator, a display device for displaying graphic data and a computer for preparing and correcting graphic data by a command input from the operator and for making display control of the display device. When the operator wants to know the content of the command that is executed, he instructs the command to the computer. A command name, a processing content and a figure as an object of processing are calculated from history data instructed from the computer. The figure as the object of processing, the command processing content and the relation of correspondence are symbolized and displayed on the display device. Furthermore, a parametric figure is also displayed visually on the display device.

13 Claims, 14 Drawing Sheets

FIG. 3

| COMMAND NAME | FUNCTION | PARAMETER |
|---|---|---|
| RECT | DRAWING OF RECTANGLE | TWO COORDINATES ON DIAGONAL |
| POLY | DRAWING OF POLYGON | VERTEX COORDINATE OF POLYGON |
| LAYER | DEFINITION OF FIGURE PREPARATION LAYER | LAYER NAME |
| SELECT | SELECTION OF FIGURE | TWO COORDINATES ON DIAGONAL |
| UNSELE | RELEASE OF SELECTION | NONE |
| DELETE | DELETION OF SELECTED FIGURE | NONE |
| MOVE | MOVEMENT OF SELECTED FIGURE | MOVE REFERENCE POINT COORDINATES, MOVEMENT DESTINATION COORDINATES |
| COPY | COPY OF SELECTED FIGURE | COPY REFERENCE POINT COORDINATES, COPY DESTINATION COORDINATES |
| GUIDE | DISPLAY OF COMMAND INFORMATION | COMMAND NUMBER OF ITS HISTORY (IF PARAMETERS ARE DELETED, NUMBER OF COMMAND EXECUTED LAST IS DISPLAYED) |
| HIST | DISPLAY OF COMMAND HISTORY | EITHER ONE OF ON/OFF |

FIG. 4

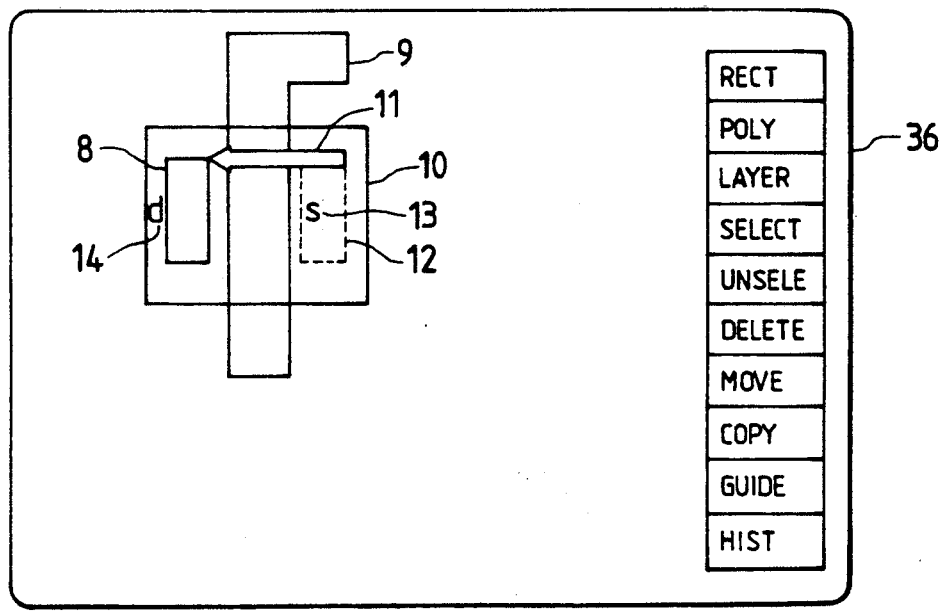

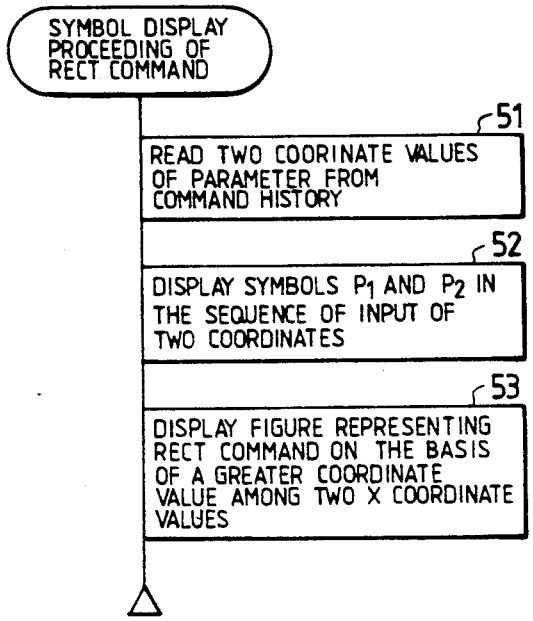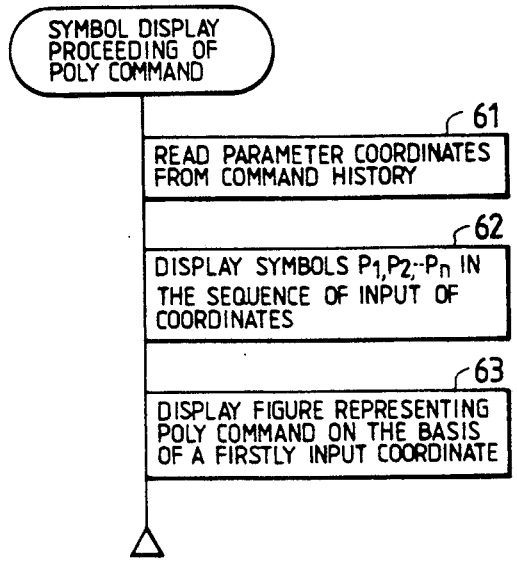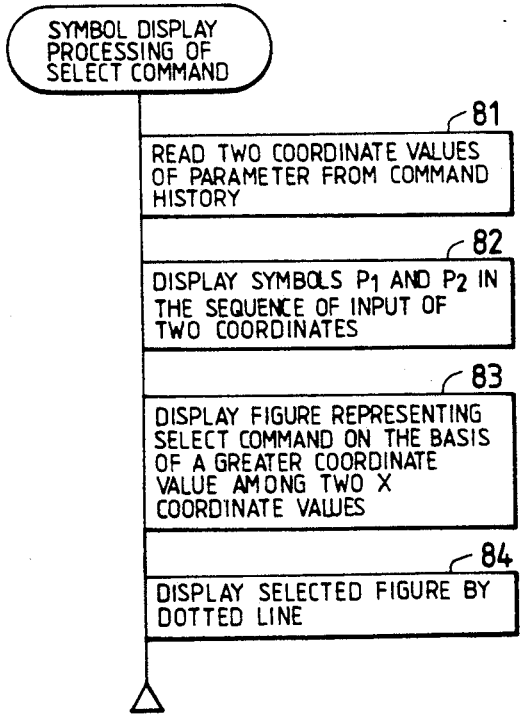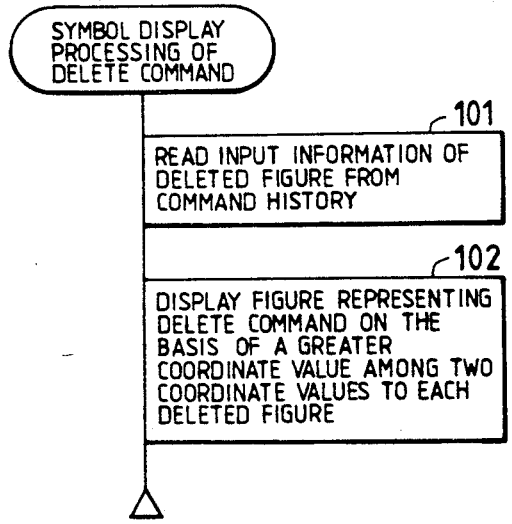

FIG. 9A

SYMBOL DISPLAY PROCESSING OF MOVE COMMAND

- 111: READ TWO COORDINATE VALUES OF RARAMETER FROM COMMAND HISTORY
- 112: DISPLAY SYMBOLS s AND d IN THE SEQUENCE OF INPUT OF TWO COORDINATES
- 113: CALCULATE PREVIOUS LOCATION OF FIGURE AS AN OBJECT OF MOVEMENT AND DISPLAY IT BY DOTTED LINE
- 114: DISPLAY FIGURE REPRESENTING MOVE COMMAND ON THE BASIS OF REFERENCE POINT COORDINATES BEFORE AND AFTER MOVEMENT

FIG. 9B

SYMBOL DISPLAY PROCESSING OF COPY COMMAND

- 121: READ TWO COORDINATE VALUES OF PARAMETER FROM COMMAND HISTORY
- 122: DISPLAY SYMBOLS s AND d IN THE SEQUENCE OF INPUT OF TWO COORDINATES
- 123: CALCULATE PREVIOUS LOCATION OF FIGURE AS AN OBJECT OF COPY
- 124: DISPLAY FIGURE REPRESENTING COPY COMMAND ON THE BASIS OF REFERENCE POINT COORDINATES BEFORE AND AFTER COPY

FIG. 9C

SYMBOL DISPLAY PROCESSING OF UNSELE COMMAND

- 91: READ INFORMATION OF FIGURE RELEASED FROM SELECTION FROM COMMAND HISTORY
- 92: DISPLAY EACH FIGURE RELEASED FROM SELECTION BY DOTTED LINE
- 93: DISPLAY FIGURE REPRESENTING UNSELE COMMAND ON THE BASIS OF REFERENCE POINT COORDINATES OF EACH FIGURE RELEASED FROM SELECTION

FIG. 9D

SYMBOL DISPLAY PROCESSING OF LAYER COMMAND

- 71: READ FIGURE PREPARATION LAYER NAME FROM COMMAND HISTORY
- 72: DISPLAY LAYER NAME AND FIGURE REPRESENTING LAYER COMMAND AT THE CENTER OF DISPLAY SURFACE

FIG. 10
| COMMAND NUMBER | COMMAND NAME, PARAMETER | FIGURE NUMBER OF AN OBJECT TO BE PROCESSED | FIGURE INFORMATION | NUMBER OF FIGURE PRODUCED |
|---|---|---|---|---|
| 1 | RECT (100, 100)(200, 150) | 1 | R, 100, 100, 200, 150 | 1 |
| ⋮ | ⋮ | ⋮ | ⋮ | ⋮ |
| 7 | MOVE (200, 200)(200, 300) | 1 | R, 100, 200, 200, 250 | |
| ⋮ | ⋮ | ⋮ | ⋮ | ⋮ |
FIG. 11
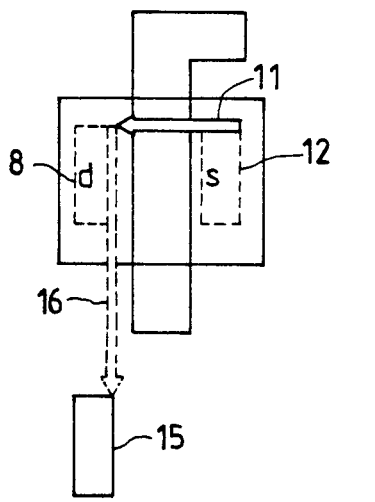
FIG. 12
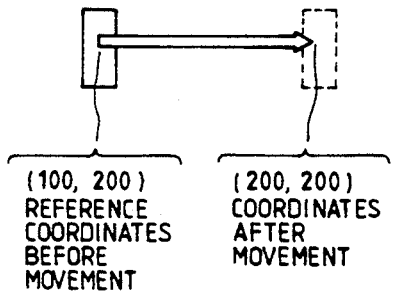
MOVE MOVEMENT OF SELECTED FIGURE
(100, 200) REFERENCE COORDINATES BEFORE MOVEMENT
(200, 200) COORDINATES AFTER MOVEMENT

GRAPHIC DISPLAY APPARATUS

This application is continuation of application Ser. No. 375,876, filed Jul. 6, 1989 now abandoned.

FIELD OF THE INVENTION

This invention relates to a guidance display system in an interactive system with a computer and to a guidance display suitable for making the content of an executed command processing more easily comprehensible by an operator.

BACKGROUND OF THE INVENTION

When a command is inputted, a guidance display of a conventional interactive system displays the inputted command name, what parameters are required next by the command, a value of an inputted parameter and the command input data that have so far been inputted in the form of a guidance of character strings. When an undo processing of the command is executed, the command processing that is executed last becomes an object of display, but the object of the undo processing is not clearly displayed for the operator. A conventional technique of this kind is disclosed in the chapter 5.4 "Undoing of Inputted Command" in "Manual of HITAC Programming Supported Editor ASPEN", pp. 92.

Furthermore, "VLSI Silicon Compilation and The ART of Automatic Microchip Design", published by Prentice-Hall, Inc., 1983, discloses a method of describing geometric points in terms of the two Y-values, BOTTOM and TOP, on page 26 with reference to FIG. 1.12 as a display system of a parametric figure. This system describes the apex coordinates of a figure only by characters by use of constants, variables and their calculation formulas.

When an operator wants to know the commands that have been executed in the past, he must read the necessary information from the history of the commands displayed as character strings, which requires a long time for understanding. When the number of kinds of commands becomes great, he is likely to make a mistake because there exist similar command names and because the number of characters of the command name becomes longer. Furthermore, the operator must interpret the relation between a command and a figure prepared by the command from the parameters of the command displayed on a display surface. This interpretation is difficult even for the command that is executed last and is extremely difficult particularly when the past commands and the command history are not displayed. When a command for undo processing is made, the operator is likely to misjudge which figures are affected by the undo processing and to execute unnecessary undo processing. Accordingly, there has been such a drawback that erroneous operations of the graphic display apparatus are likely to occur frequently.

The conventional parametric graphic display system explained above is not easy to comprehend by the operator and therefore involves the following problems.

Since the system represents a given figure only by characters, the system is not visual and it is extremely difficult for the operator to understand the positioned relation between apexes and the shape of the figure and to form an image of the actual figure in his or her mind.

Since the parametric figure as the object is expressed by use of the coordinates of the apex, it is necessary to express all the coordinates of the apexes that move when the distance is made variable, even though the distance between points (or sides) which is to be made variable is only one. Accordingly, the formulas representing the apex coordinates get complicated with the increase in the number of parameters, a great deal of time and labor are necessary to express a parametric figure and mistakes are more likely to occur.

As described above, the conventional method requires a long time for the preparation and correction of a parametric figure.

SUMMARY OF THE INVENTION

An object of the present invention is to provide a graphic display apparatus which makes the object of undo processing and the processing content more easily comprehensible by an operator by symbolizing and displaying the processing content of the command as the object of the undo processing when the processing result by the command input by the operator is undone in an interactive graphic processing system for designing an LSI pattern or the like through interaction between a computer and an operator.

A second object of the present invention is to provide a graphic display apparatus which is easier to use for the expression of a parametric figure than the conventional graphic display apparatuses.

The first object of the invention described above can be accomplished by instructing the command to the computer so that the computer system calculates the command name, the processing content and the processing object figure from the command history data of the instructed command and symbolizes and displays the processing object figure, the command processing content and their correspondence when the operator wants to know the content of the command that is executed.

Since the processing content of the command is displayed as a symbol by the method described above, the content of the command processing can be easily understood visually. Since the correspondence between the processing object figure and the command is displayed, too, the processing object figure can be distinguished easily.

The typical inventions disclosed for accomplishing the second object described above are briefly as follows:

(1) A typical example of a parametric figure as the display object (an example of the figure which can be specified by giving parameter values, for instance) is displayed or compiled on the display surface of a graphic display apparatus as a basic figure.

(2) Among the basic figures of the item (1) above, a symbol representing a variable distance, such as an arrow and a variable or a formula representing its distance, are put between a side and another or between a point and another whose interval is to be made variable. A symbol such as X and variables or a formula are put to the apex whose position is to be made variable.

(3) Auxiliary lines are drawn on the extensions of the side and symbols are put thereto if the symbol cannot be put directly onto the figure such as when the sides which are to be made variable do not face each other or when the coordinates of the point not existing on the basic figure are indicated.

The display or compilation means for accomplishing the second object of the present invention operates in the following way.

(1) Since the typical example of the parametric figure as the display object is displayed by a figure on the display surface, the schematic shape becomes more easily comprehensible by the operator.

(2) Since the portion which is to be made variable can be displayed directly by the symbol on the display surface due to the effect (1), the shape of the fixed portion and the location of the variable portion are expressed visually so that the operator can more easily visualize the actual figure.

(3) The parametric figure as the display object is not expressed by the coordinates of each apex alone but is expressed by designating the distance between the points (sides) which are variable on the basic figure. Accordingly, it is not necessary to designate the portions which move in accordance with variables but which has a fixed distance between the points (sides) and the display/compilation work becomes simplified. When a plurality of portions which are to be made variable are designated, too, the relative distances between their points (sides) are designated. Accordingly, the influences of other variable portions are not exerted, a complicated formula considering the relation between the parameters need not be used and the coordinates of all the moving apexes need not be expressed by formulas, either.

BRIEF DESCRIPTION OF THE DRAWINGS

FIG. 3 is an explanatory view of functions corresponding to command names and parameters;

FIG. 4 shows the display state immediately before and after the movement of a figure;

FIG. 8A is a flowchart of processing for a rectangular command;

FIG. 8B is a flowchart of processing for a polygon command;

FIG. 8C is a flowchart of processing for a selection command;

FIG. 8D is a flowchart of processing for a delete command;

FIG. 9A is a flowchart of processing for a move command;

FIG. 9B is a flowchart of processing for a copy command;

FIG. 9C is a flowchart of processing of an unselect command;

FIG. 9D is a flowchart of processing of a command which designates a layer;

FIG. 10 shows a recording example of a command history;

FIG. 11 shows a guidance display of a first move command in a rectangle subjected to move processing twice;

FIG. 12 shows an example of processing for the move command;

DETAILED DESCRIPTION OF THE PREFERRED EMBODIMENTS

Figure 1:
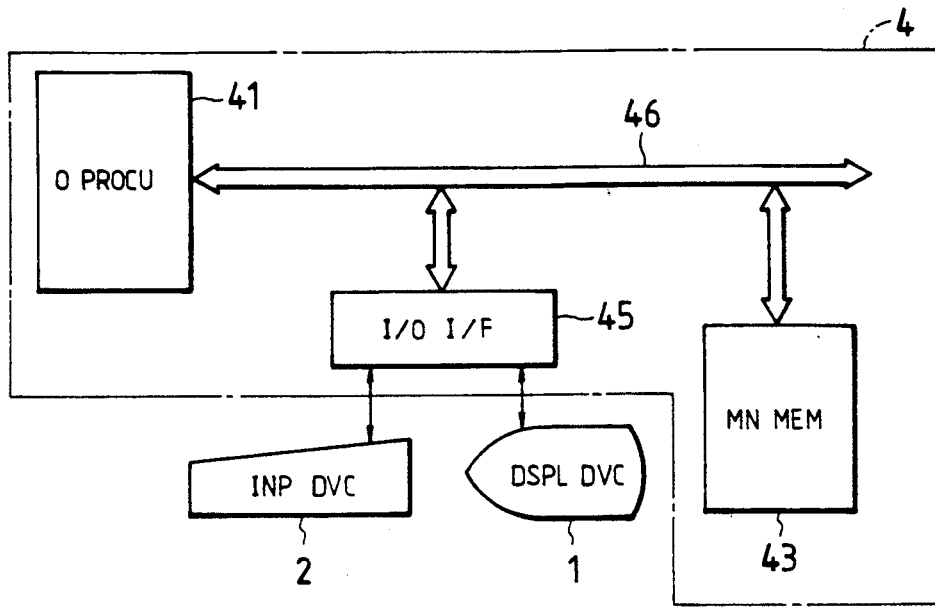
FIG. 1 shows an example of a graphic display apparatus to which the present invention is applied.

The graphic system to which the graphic display/compilation system of the present invention is applied is the same as a general microcomputer system and consists, as shown in FIG. 1, of a display device 1 for displaying characters and figures, an input device 2 such as a keyboard or a tablet for inputting data and commands and a computer 4. The computer 4 for controlling the preparation, correction and display of the figure consists of a main memory 43 for storing compilation data and an operational processing unit 41 for decoding a program and operating graphic data by use of given parameters. An interpreter program for supporting the compilation works, such as the input, movement and undoing of the data by an interactive system, is stored in the main memory 43. The display device 1 and the input device 2 are connected to the operational processing unit 41 through an I/O interface 45 and a system bus 46 consisting of an address bus, a data bus and a control bus.

The operator inputs the command and the command parameters into the computer 4 by the input device 2, judges the display content of the graphic display 1 on the processing result of the computer 4 and inputs again the command. These operations are repeated consecutively until a necessary result is obtained.

Hereinafter, the display device for accomplishing the first object of the present invention will be explained with reference to FIGS. 2 to 14.

Figure 2:
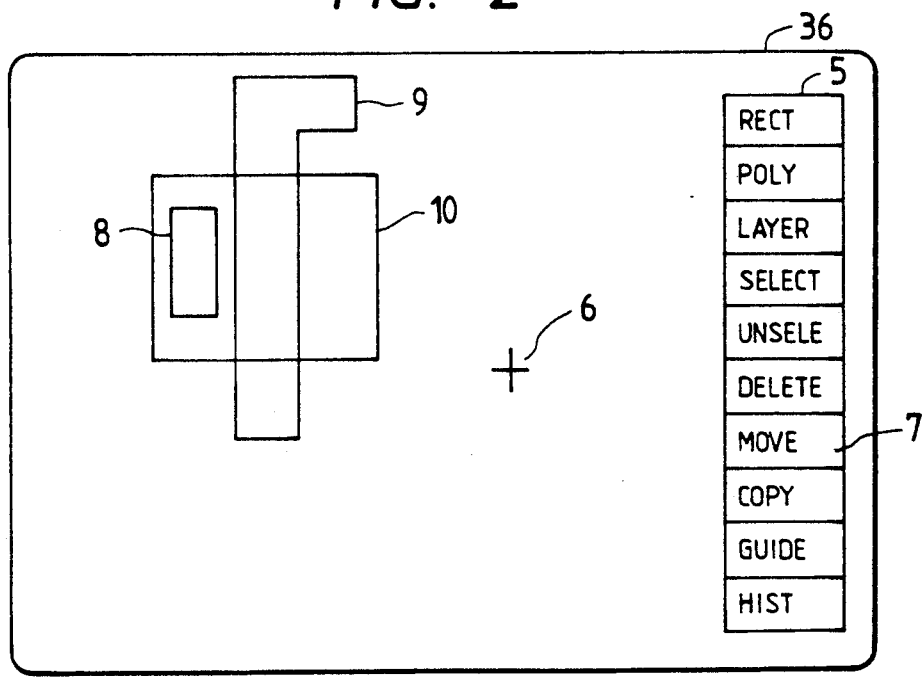
FIG. 2 shows an example of a display surface of a graphic display and is useful for explaining the input of a command and a command parameter by a mouse device and a keyboard device.
Figure 5:
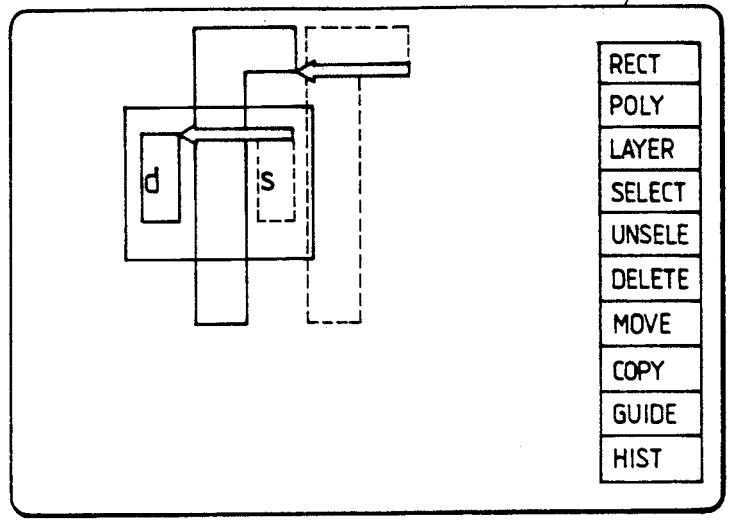
FIG. 5 shows the display state when the figure of the movement object is two.

FIG. 2 shows an example of the display surface of the graphic display 1 useful for inputting the command and the command parameters by use of a the mouse device (not shown) and the keyboard 2. In the case of the mouse device, the input of the command is conducted by positioning a cursor 6 moved by the mouse inside any of the command areas of the command column 7 of the menu 5 displayed on the graphic display and pushing the button of the mouse. In the case of the keyboard, the input work is conducted by typing the name of the command. The command names are displayed inside the command column 7. If the command parameters are character strings and numeric values, they are inputted from the keyboard 2 in accordance with the input instruction display from the computer 4 and if they are coordinates values, they are inputted by moving the cursor 6 to the necessary position inside the display surface of the graphic display 1 by the mouse and then pushing the button of the mouse or typing the sets of the X/Y coordinate values. In this embodiment, seven to ten commands are set to the command column 7.

FIG. 3 shows the functions of the commands and their parameters set to the command column 7. A rectangular command (hereinafter referred to as the "rect" command) and a polygonal command (hereinafter referred to as the "poly" commands) are command for the preparation of a figure and to generate a rectangle and a polygon in the figure preparation layer set by a layer command. The figure preparation layer includes AL representing an aluminum wiring layer, PS representing a polysilicon layer, D representing a diffusion layer and CNT representing a contact layer, and the layer command designates by which layer the figure is to be prepared. A select command selects the figure as the object of movement/delete/copy processing (or selection figure). For example, the figure contained in the rectangular area is the processing object of the selection processing. An unselect command (hereinafter referred to as the "unsele" command) releases the selection of the figure selected by the select command. Delete, move and copy commands execute delete, move and copy processings of the selected group of figures, respectively. In the move/copy (move or copy) processing, each of the selected figures is moved or copied in accordance with the vector prepared by the inputted move (or copy) reference point coordinates and the movement destination (or the copy destination) coordinates. A guide command makes guidance display of a the content of a given command from the command number of command history. It effects guidance display of the content of the command executed finally when the parameters are deleted. A hist command displays a table of commands that have been executed so far from the upper left portion of the picture surface. Each command to be displayed is displayed with a serial number from the start of use of the system.

Figure 6:
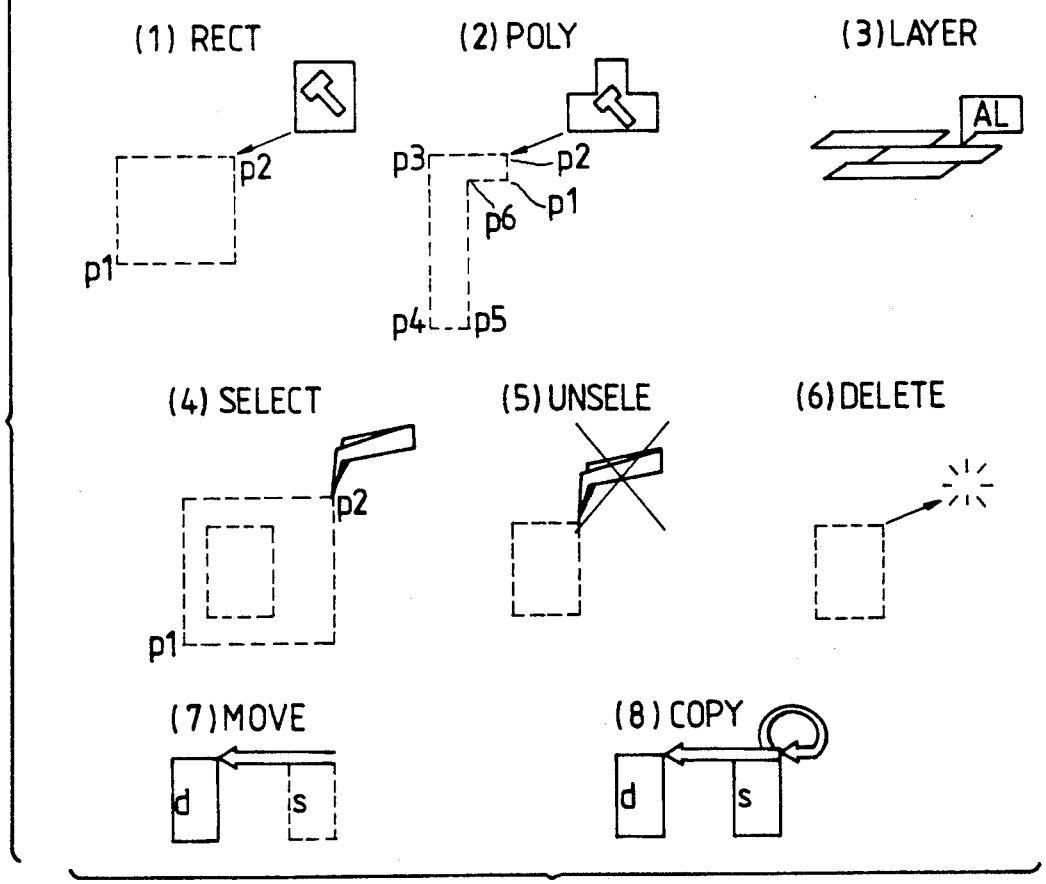
FIG. 6 shows the display state when an immediately preceding command is a command other than a move command.
Figure 7:
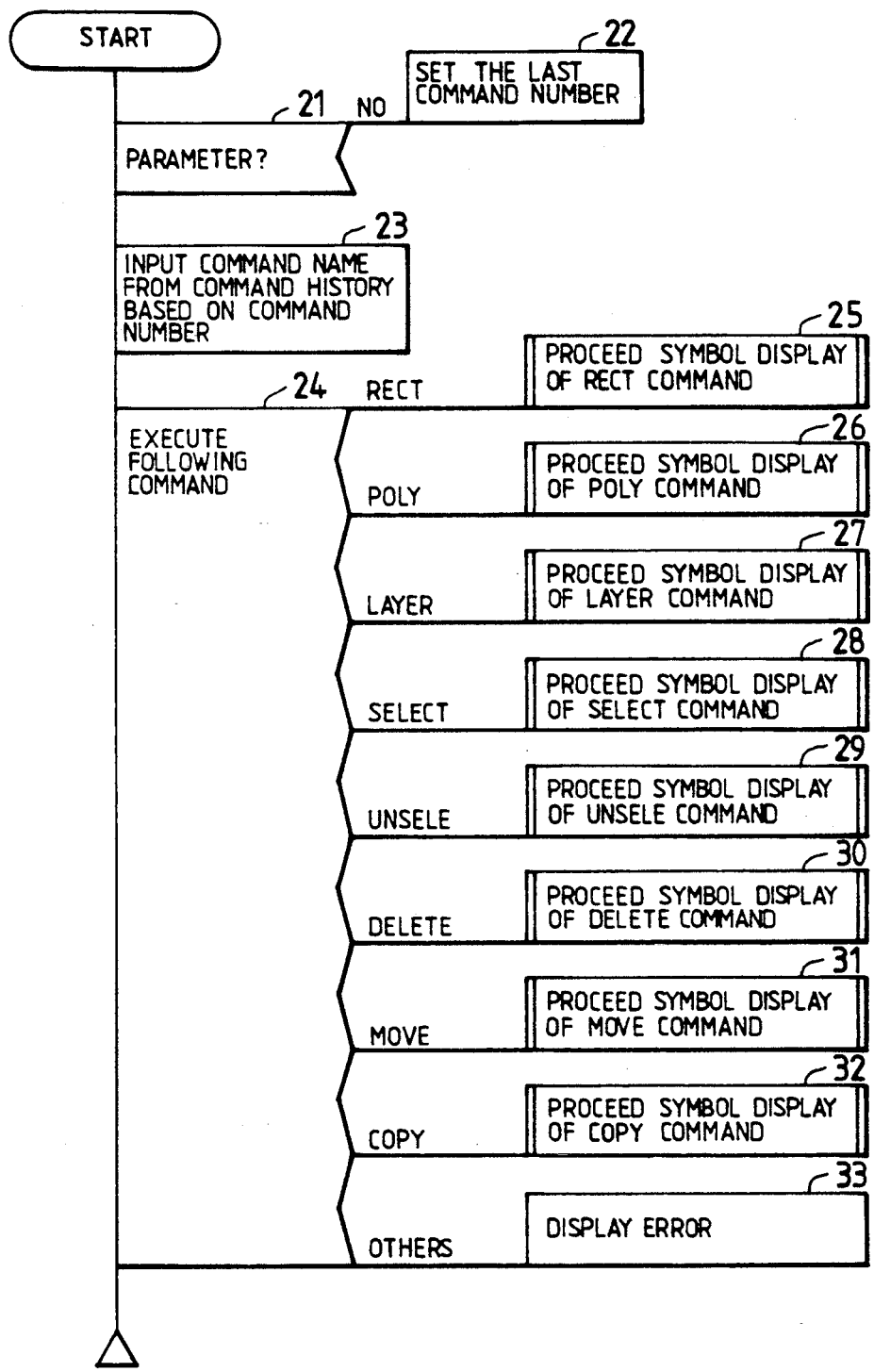
FIG. 7 is a flowchart from the input of a guide command into a computer to the step before shift to each processing routine.

FIG. 4 shows the display state immediately after the movement of a figure is made. FIGS. 8, 9 and 10 are displayed on the display surface 36 and only the FIG. 8 is the one that has moved. When the guide command is executed for the command immediately before in order to know the processing content of the command, the content of the command processing is symbolized and displayed as shown in FIG. 4. Here, since the immediately preceding command is the move command, the number 11 with an arrow, the letter "s" 13 representing the reference coordinate point before the movement, the alphabet "d" representing the destination coordinate point and the FIG. 12 before the movement are represented by dotted line and the figure after the movement is displayed with high brightness. The letters with arrows represent the move command and are displayed in such a manner that both ends of each letter with arrow are in agreement with the reference point of the figure moved. Therefore, the length of each letter with arrow represents the distance of movement and can display the content of processing of the move command together with the figure before the movement which is represented by dotted line. The letters "s" and "d" represent the coordinate positions of the input parameters of the move command. In this example, only one figure as the object of movement is provided, but if it is 2, the letter with arrow and the figure before the movement are displayed in the same number as the number of objects of movement, that is, two. This holds also true of the case where the object figures are two or more. One set of the letters "s" and "d" are displayed because they are the input of the move command. Even when the immediately preceding command is a command other than the move command, it is displayed in the same way, as shown in FIG. 6. In FIG. 6, in the cases of the (1) rect command and (2) poly command, the prepared figures are displayed by dotted lines and characters p1 . . . pn representing the input points and figures representing the command are displayed in the proximity of the input point coordinate positions. In the (3) layer command of FIG. 6, a figure representing the layer command is displayed at the center of the picture surface and the layer name that is set is also displayed.

In the example shown in the (3) layer command of FIG. 6, the AL layer is shown. In the (4) select command of FIG. 6, the figure representing the command and a rectangle having the input coordinates as the opposite angle are represented by dotted line and the selected figure, too, is represented by dotted line. In the (5) unsele of FIG. 6, each figure released from the selection is displayed by dotted line. In the (6) delete of FIG. 6, the deleted figure is displayed by dotted line and a figure representing the command is displayed for each figure. In the (8) copy of FIG. 6, the display is similar to that of the (7) move, but the figure as the object of processing is displayed by high brightness but not by dotted line.

FIG. 7, FIGS. 8A, 8B, 8C and 8D (hereinafter collectively referred to as FIG. 8) and FIGS. 9A, 9B, 9C and 9D (hereinafter collectively referred to as FIG. 9) show the flow of computer processing of the guide command in this embodiment. At step 21, the parameter of the guide command is examined and step 21 is executed if the parameter is omitted. If the parameter exits, the flow shifts to step 23. The command number of the command that is executed finally is set as the parameter of the guide command from the command history and the flow shifts to step 23. At this step 23 the command name in the command history is inputted from the command number. At step 24, each processing routine 25, 26, 27, 28, 29, 30, 31 and 32 for each command is executed by the command name. Incidentally, step 33 represents an error display and "error" is displayed definitely. FIGS. 8 and 9 show the flow of processing of each of these processing routines.

In the processing of the rect command of FIG. 8A, two coordinate values of the parameter are read from the command history at step 51 and the symbols p1 and p2 representing the input coordinates of the parameters in the sequence of input are displayed at the upper left portion of the input coordinates at step 52. At step 53, the figure shown in (1) of FIG. 6 representing the rect command is displayed with coordinates having a greater X coordinate value among the two coordinate values of p1 and p2 being the reference point and the rectangular figure is displayed by dotted line from the input coordinates.

In the processing of the poly command in FIG. 8B, the parameter coordinate values are read from the history at step 61, and the symbols p1, p2, . . . , pn representing the input coordinates are displayed in the input sequence of parameters at step 62. At step 63, the figure representing the poly command is displayed with the right uppermost coordinate Pi (i is an arbitrary number among 1, 2, . . ., n) as the reference point and the polygonal figure is displayed by dotted line from the input coordinates.

In the processing of the select command of FIG. 8C, the parameter coordinate values are read from the history at step 81, and the symbols p1 and p2 representing the input coordinates are displayed in the entry sequence of parameters at step 82. At step 83, the figure representing the select command is displayed by use of the coordinates having a X coordinate value among the two coordinate values as the reference point and a rectangular figure representing a window for selection is displayed from the input coordinates by dotted line. At step 84, the information of the selected figure group is obtained from the command history and their figures are displayed by dotted line.

In the processing of the delete command shown in FIG. 8D, the information of the deleted figure group is obtained from the command history at step 101 and at the subsequent step 102, their figures are displayed by dotted line and a figure representing the delete command is displayed at the reference point coordinates of these figures. The reference point of the figure is the right uppermost top coordinates in the case of the rectangle and the top coordinates that is first inputted in the case of the polygon.

In the processing of the move command of FIG. 9A, the parameter coordinate values are read from the history at step 111 and the letters "s" and "d" representing the input coordinates are displayed in the entry sequence of the parameter at step 112. The information of the figure group as the object of movement is obtained from the command history at step 113 and the figure group is displayed by dotted line. At step 114, a figure representing the move command is displayed for each figure from the reference points of the figure before and after the movement and the figure after the movement is displayed with high brightness.

In the processing of the copy command of FIG. 9B, the parameter coordinate values are read from the history at step 121, and the letters "s" and "d" representing the input coordinates are displayed in the entry sequence of the parameter at step 122. At the subsequent step 123, the information of the figure group as the object of copy is obtained from the command history and the figure group is displayed with high brightness. At step 124, the figure representing the copy command is displayed from the reference points of the figure before and after copy for each figure, and the figure after the copy is displayed with high brightness.

In the processing of the unsele command of FIG. 9C, the information of each figure released from selection is obtained at step 91 and each figure is displayed by dotted line at step 92. At the subsequent step 93, the figure representing the unsele command is displayed by using the reference point coordinates of each figure as the reference.

In the processing of the command designating the layer in FIG. 9D, the figure preparation layer name is obtained from the command history at step 71 and the layer name and the figure representing the layer command is displayed at the center of the display surface at step 72. The command history stores the information shown in FIG. 10 for each command. The first information is the command number and the number is put sequentially from 1 for each command operation from the start of operation of the system. The second information is the command name and the input parameter, the third is the list of the figure number of the figure as the object of processing and the fourth is the figure information as the processing result. The figure information of the processing result consists of the figure kind and the top coordinate line of the figure. In the case of the rectangle, the figure kind is "R" and the left lower and right upper coordinates are the top coordinates lines and in the case of the polygon, the figure kind is "P" and the top coordinates lines of the polygon are the top coordinates lines. They are recorded in the entry sequence. The sequence of the figure information corresponds to the figure number list. The fifth information is the figure number of the figure prepared by the processing and it is recorded, too. If the figure information before processing is necessary, such as in the move command, the move, copy, rect and poly commands are sequentially retrieved as the commands using the same figure number as the object of processing and the figure information of the processing result of the command that is first retrieved is used.

In the embodiment described above, only the guidance relating to the command content and the figures before and after the processing of the command are displayed, but when the figure is subjected to processing a plurality of times after it is formed, the contents of such processings may be displayed as the guidance as illustrated below. In such a case, the processing content for the figure is more comprehensive. FIG. 11 shows the case where there is the rectangle 15 which is twice subjected to move processing and the guidance for the first move command is displayed. In addition to the arrow 11 representing the first move command, the arrow 16 representing the next move command is displayed by dotted line. It can be understood that the rectangle 15 is subjected continuously to the two move processing from the position 12 through the position 8. Since the figure representing the rect command exists in the rectangle shown in FIG. 6(1) at the position 12, it can be understood that the move command as the guidance object is the first move processing after the preparation of the rectangle. As to the guidance for the commands other than the command in the question, only those before or after the command in the question may be displayed or display control of the guidance of one or more associated commands may be made in accordance with the instruction from the operator. The figure representing the command may be displayed by a motion picture. For instance, it is possible to display a length of the arrow representing the move command by a motion picture in which the length of the arrow can be displayed repeatedly in such a manner that the length of the arrow is gradually lengthened from zero to a moved distance of the arrow or the length of the arrow is gradually moved from one position in which the movement of the arrow is not started to another position in which the movement of the arrow is finished. Furthermore, it is possible to display the figure as the object of the command processing not by the dotted line display or by high brightness display but by color display in a color different from an ordinary color or by ON/OFF display. The command designation for displaying the guidance may be made by designating the figure that is displayed, not by relying on the input of the command number as is employed in the embodiment described above. In the case of the figure designation, the guidance for the command having the figure number in the command history may be displayed based on the figure number of the designated figure.

In accordance with the system described above, the content of the executed command is symbolized and displayed. Therefore, the operator can easily understand the content of the command and the figure as the object of processing can also be distinguished easily.

Next, the command usage method display system using the system described above will be explained.

A help function which explains the function of the command of a system during the system execution for the operator who is not much experienced in the use of a computer system has been employed widely in many systems because it improves the operation factor and can easily educate beginners of the computer system. However, since the explanation is all made through character strings, it is not easy for the operator to understand how processing is made in practice, though he can understand the command function and the command format. This becomes a serious problem particularly when the coordinates indicator, such as the mouse or the tablet, is used. Therefore, the guidance which is made to correspond to the command parameter is displayed with the command input format and its explanation when the command usage method is displayed.

FIG. 12 shows an example of processing of the move command. The explanation of the function of the command and its parameter is displayed below the format example of the move command and the example of the command processing is displayed above it. Furthermore, the first and next parameters and the relation of correspondence of the parameters in the move processing are displayed. If the guidance is displayed in this manner, the meaning of the parameter of the command can be understood more easily and even those operators who are not much experienced can understand the command. Though the example given above represents the explanation of the move command, the guidance is displayed similarly for the other commands. The detailed explanation statement of the command function or the like may be displayed, too.

The command undo system using the present system will be explained with reference to FIGS. 13 and 14.

Figure 13:
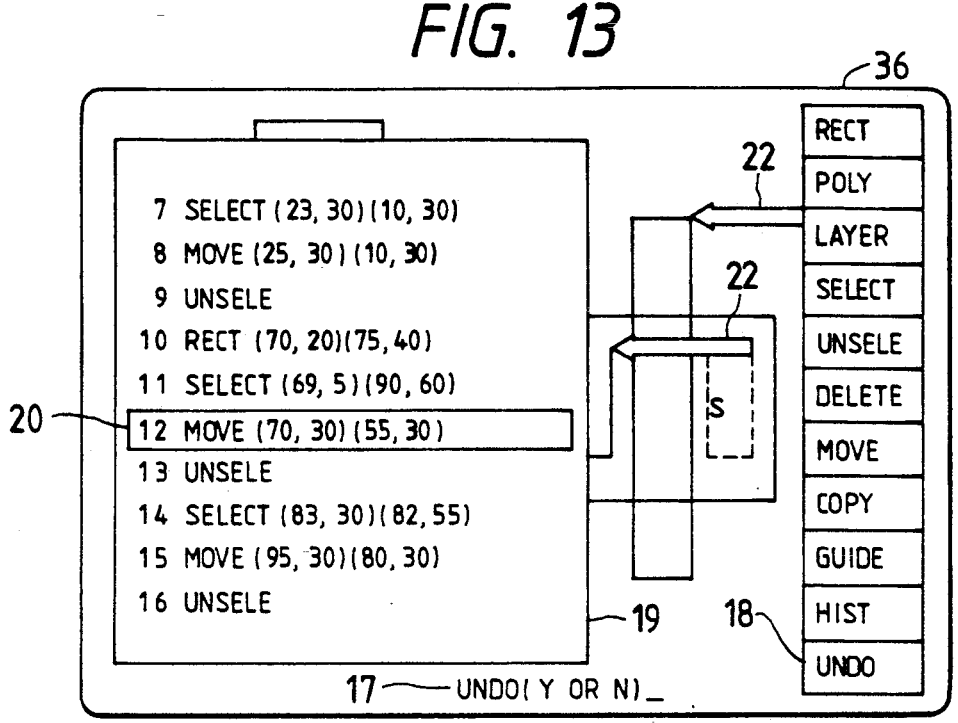
FIG. 13 shows an example of a display surface of an undo processing of a command.
Figure 14:
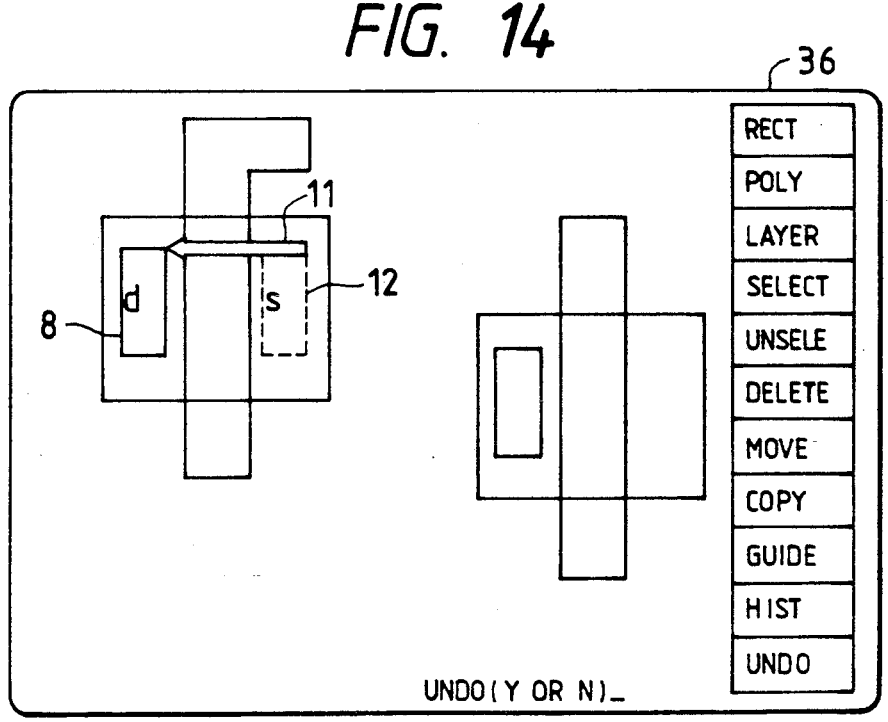
FIG. 14 is an explanatory view of judgment of a processing object figure which is to be undo.

The command undo processing is executed by the undo command represented by reference numeral 18 in FIG. 13 showing an example of the display surface, the processing content of the command as the object of the undo processing is displayed in the same way as the embodiment shown in FIG. 6(1) to 6(8) and at the same time, an execution confirmation message 17 is displayed. When this command undo execution is carried out, the operator makes the key input of "Y" and when it is not carried out, he makes the key input of "N". The command number of the undo object is inputted from the command history 19 to the parameter of the undo command. In FIG. 13, the command number 12 is inputted, the rectangle 20 as the input echo is displayed in the command history and the processing content of the move command of the command number 12 is displayed as represented by the arrow 22. Here, the figure as the object of the undo processing is one FIG. 8 in FIG. 14 and the operator can understand that the command number as the undo object is only 8 or 12. It will be assumed hereby that the undo processing of the command number 12 is made. In this case, since the object figure is two from the arrow 22 in FIG. 13, the operator can immediately understand that the command number 12 is not the command as the undo object and cancels the undo processing. Next, when the undo processing of the command number 8 is made, the operator can understand that the object figure is 8 from 11 in FIG. 14 and executes the undo processing (UNDO). In this manner it is not necessary to memorize the object command of the undo processing by controlling whether or not the undo processing is executed by confirming the figure as the object of the undo processing, and it is not necessary, either, to interpret the object figure of the command from the parameter value in the command history. Accordingly, the undo processing can be executed with high operation factors. Since the figure position after the undo processing can be confirmed, it is possible to avoid the erroneous execution of the undo processing. Though the designation of the command as the object of the undo processing is made by the command number in this embodiment, it is also possible to designate the command display row on the command history by use of a mouse or the like and to obtain the command number from that coordinate value. It is further possible to designate the figure for which the undo processing is to be executed without using the command number and to obtain the associated command number from that figure number.

In accordance with the present invention, the content of the executed command is symbolized and displayed, the operator can more easily understand the content of the command and the guidance display capable of easily distinguishing the figure as the processing object of the command can be made.

Next, the display device for accomplishing the second object of the present invention will be explained with reference to FIGS. 15 to 33.

The system of the present invention uses, as the data (symbols) as the object of display and compilation, apex data representing the apex whose coordinates are variable, interval data representing the interval between variable sides and points, parameter data representing the formulas or variables representing the coordinate values of the apex data or the length of the interval data and auxiliary line data representing auxiliary lines which are added when a side and another forming the interval which need to be made variable do not face each other, in addition to the graphic data. This data is indicated on the display surface by a solid line for the graphic data, symbol X for the apex data, an arrow for the interval data, character strings for the parameter data and a dash line for the auxiliary line data as shown in FIG. 15, respectively, and are distinguished from one another in the main memory by putting a code representing each attribute.

Figure 15:
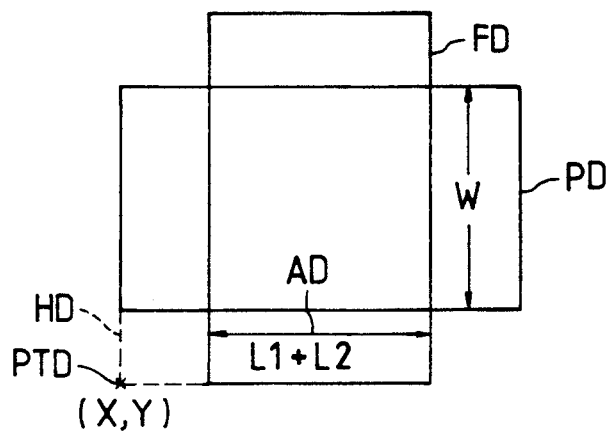
FIG. 15 is an image diagram showing an example of the figure which is expressed by a parametric graphic display system of the present invention.
Figure 16:
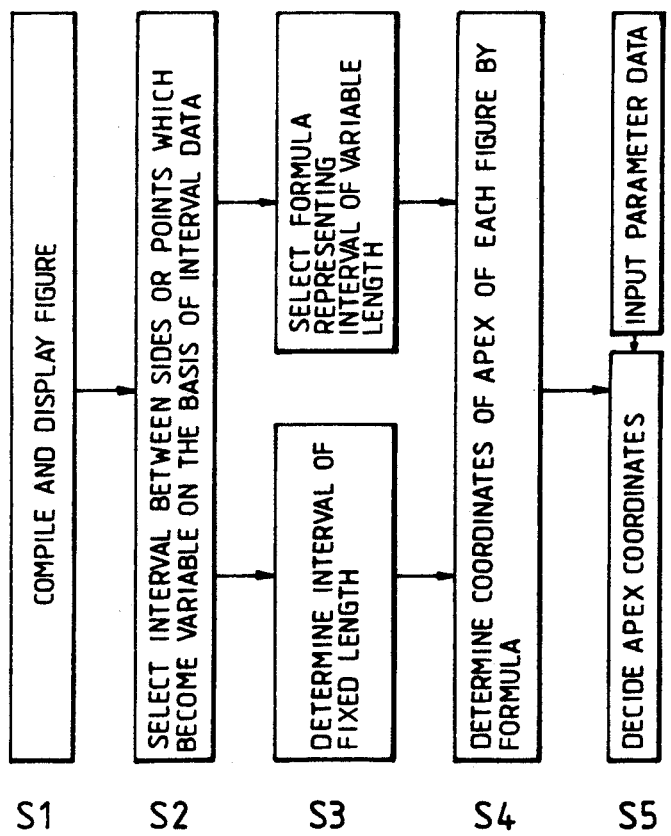
FIG. 16 shows an example of the flowchart in the parametric display/compilation system of the present invention.

FIG. 15 expresses an example of a parametric figure using the data for compilation described above. In this drawing, solid line FD is the graphic data, X mark PDT is the apex data, arrow AD is the interval data, formula $L_1+L_2$ and variable $W(X, Y)$ are the parameter data and dash line HD is the auxiliary line data. Next, the procedure for deciding the shape of the figure by giving the parameters will be explained with reference to FIG. 16.

First of all, the basic figure is compiled by use of various data for compilation PTD, AD, $L_1+L_2$, $W(X, Y)$ and HD described above and its basic figure is displayed on the display surface (step S1). Next, the CPU confirms the portion at which the interval between the sides or between the points becomes variable on the basis of the compiled data. Here, if the interval data is made variable, the side crossing the two sides which come into contact with the interval data AD is selected as the side which require the formula of coordinate calculation (step S2). Next, the formula representing the interval of variable length is selected from the parameter ($L_1+L_2$) and W representing the interval between the sides or between the points in such a manner as to correspond to the interval data AD, and the interval of the fixed portion is determined in parallel with the interval of the variable portion from the graphic data (step S3). In this manner the formulas expressing the distances of all the adjacent sides and points can be obtained.

Next, the formula expressing the coordinates of the apex of each figure is determined on the basis of the formula expressing the interval between the two sides (points) described above (step S4). Here, the formula expressing the coordinates of the point at which this apex data exists is obtained from the parameter data representing the value of this apex data, and the formula representing the coordinates of the apexes adjacent to this point and the coordinates of the point of intersection are sequentially determined on the basis of the formula expressing the distance between the two sides (points). Finally, definite numeric values, for instance 10 and 20 are given to the parameter data and all the apex coordinates are decided from the parameter (step S5).

In this manner, the definite shape of the parametric figure can be decided and displayed. If the auxiliary line data exists as the data for compilation, the interval between the side and the auxiliary line data or between the auxiliary line data is determined when the distance between the sides (or points) is determined, and the subsequent procedures are conducted by regarding the auxiliary line data as the side represented by the solid line. The following effects can be obtained by adding the interval data, the apex data, the parameter data and the auxiliary data together with the graphic data to the data as the object of display and compilation.

(1) Since an example of the parametric figure is displayed on the display surface, the outline of the shape can be understood easily. Since the portion which is to be made variable is displayed on the figure, the shape of the fixed portion and that of the variable portion become more visual and the time necessary for grasping the figure to be displayed becomes shorter.

(2) Time and labor for the preparation of the parametric figure can be reduced and the work time can be shortened drastically because the position and the interval are designated for the portion which is to be made variable on the display surface, because the relative relationship is designated when a plurality of parameters are used without the necessity for considering the influences of other portions, or in other words, because it is not necessary to give the formula representing the coordinates of all the moving apexes.

(3) Analysis, calculation and display by a support program become possible by adding the various data for compilation of this embodiment to the graphic data that has already been prepared. Accordingly, the past drawings can be easily converted to parametric figures.

Figure 17:
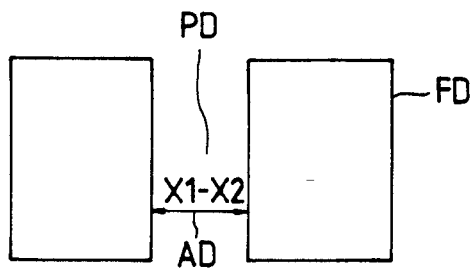
FIG. 17 shows an example when an interval between sides which bridge between figures is designated.
Figure 18:
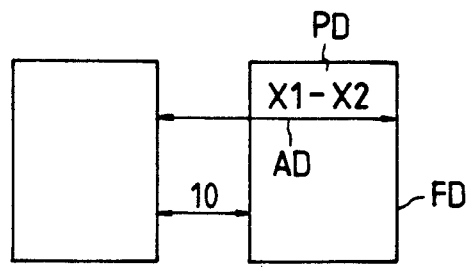
FIG. 18 shows an example when the interval between those sides which are not adjacent to each other but interpose another side between them is designated.
Figure 19:
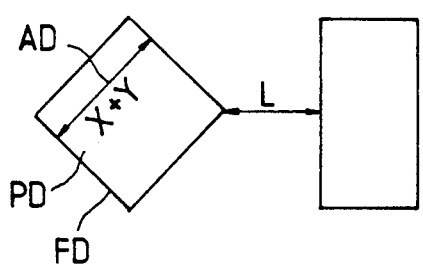
FIG. 19 shows an example when an interval data is designated in a slanting direction.

Though the embodiment described above uses the interval between the adjacent sides in the drawing as the interval data, the interval data may be that which designates the interval between the sides or between the points which are to be made variable. Accordingly, it is possible to designate the interval between the sides bridging the figures such as shown in FIG. 17 or the interval between two sides which are not adjacent to each other but interpose another side between them as shown in FIG. 18. It is further possible to express the fixed portion by designating a constant 10 as the parameter data or to express the parametric portion by use of a plurality of interval data as shown in FIG. 18, without being necessarily limited to the variable interval. It is also possible to designate the interval data AD in an inclined direction or the interval between a side and a point as shown in FIG. 19.

The symbols representing the data are not necessarily limited to those used in the embodiment described above.

Figure 20:
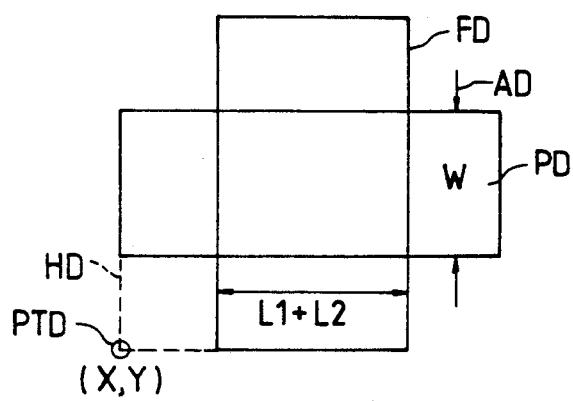
FIG. 20 shows an example when the interval data is represented by a pair of arrows facing each other and the corresponding parameter data is put between the arrows.

FIG. 20 shows the case where the interval data AD is expressed by a pair of arrows facing each other and the parameter data corresponding to it is put between the arrows so that the interval of the tips of the arrows is variable. The apex data are represented by a circle ◯.

Figure 21:
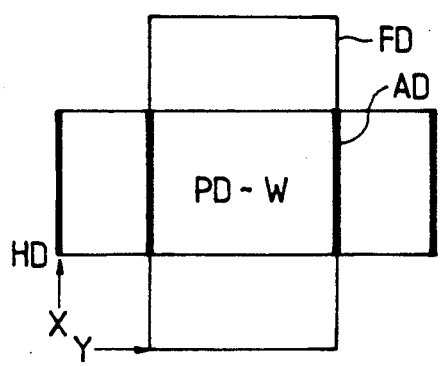
FIG. 21 shows an example where fixed sides and variable sides are represented by different kinds of lines.

In FIG. 21, the sides which become variable are displayed by a different kind of line from that of the side of the fixed portion and it means that the length of the portion of the sides with four thick lines is represented by the parameter data W. Though the sides which become variable are represented by a thick line by changing the kind of lines in this drawing, the variable portion may be expressed by changing the display method such as by changing the display colors or blinking. The data representing the coordinates values need not necessarily be the set of full dimensions such as the apex data but may be designated separately for each dimension. In FIG. 21, the symbols representing the X coordinates and Y coordinates are represented by arrows and their directions and their values are expressed by the parameter data X, Y.

As to the correspondence between the interval data AD and the apex data PTD and the parameter data PD, on the other hand, it may be recorded in the memory of the computer without display besides the method of displaying the correspondence near each data as is used in the embodiment described above.

Figure 22A:
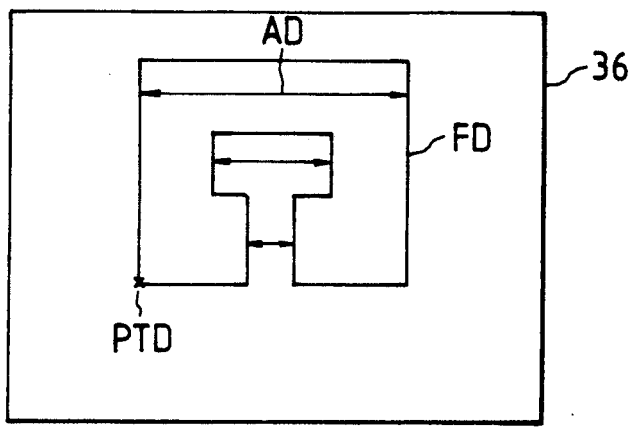
FIG. 22A shows an example where graphic data, interval data and apex data are displayed on the display surface.
Figure 22B:
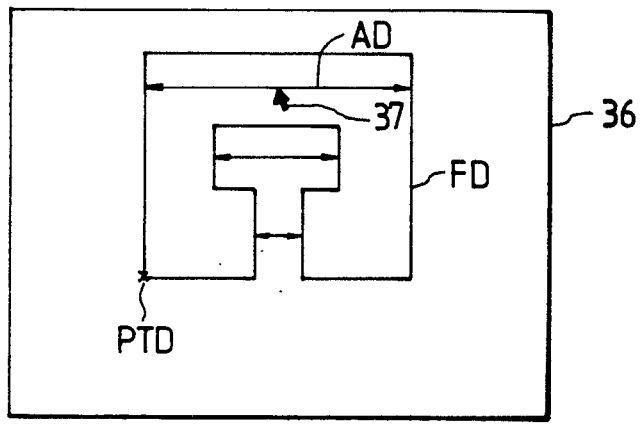
FIG. 22B shows an example where a cursor is put to the interval data or apex data to which the parameter data are to be designated under the display state of FIG. 22A.
Figure 22C:
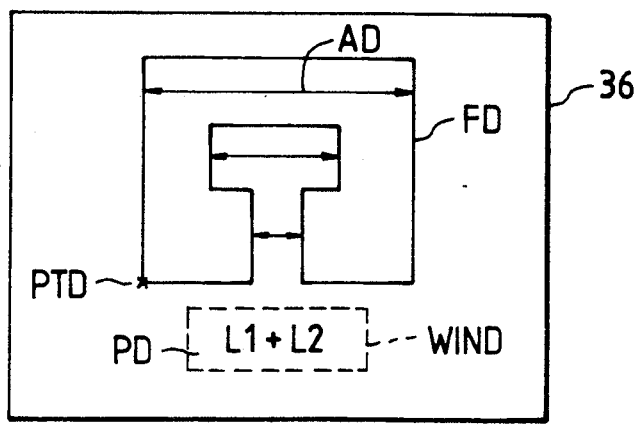
FIG. 22C shows an example where the designated data are displayed by a different display method from other portions.

FIGS. 22A, 22B and 22C show the example of the method of displaying the parameter data corresponding to the interval data or apex data designated by the operator in separate areas. Ordinarily, the graphic data FD, the interval data AD and the apex data PTD are displayed on the display surface 36 as shown in FIG. 22A but the parameter data is not displayed. Under this state the cursor 37 is put to the interval data AD or apex data PTD which is to be designated so as to designate the parameter data as shown in FIG. 22B. At this time the designated interval data AD or apex data PTD is displayed by thick line or by a different color or blinking so as to distinguish it from other portions and at the same time, the parameter display area WIND is formed on the display surface in order to display the inputted parameter data. In this manner the correspondence of the interval data AD and the apex data PTD with the parameter data PD is given implicitly. Thereafter the state is returned to the state of FIG. 22A by releasing the instruction of the cursor display.

Figure 23:
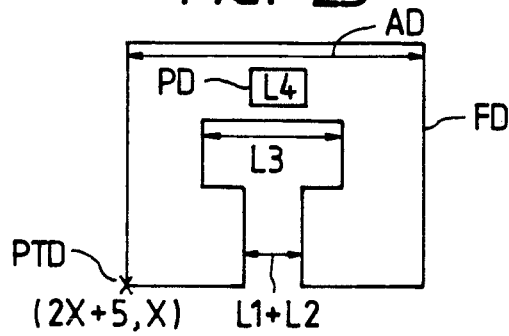
FIG. 23 shows an example where the designated interval data or apex data are displayed by a different display method from other portions.

FIG. 23 shows an example where the display method of the designated interval data AD or apex data PTD is changed from that of the other portions and the parameter data PD corresponding thereto is encompassed by frames to change sequentially the designation one set by one.

Figure 24A:
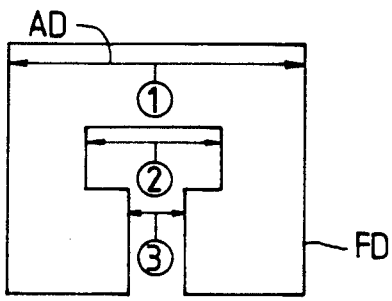
FIGS. 24a and 24b show an example where the parameter data are spaced apart from the figure and displayed at the portion of a separate display area.
Figure 24B:
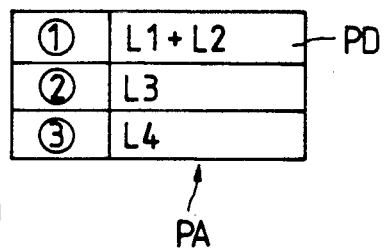

FIGS. 24a and 24b show the example where the parameter data PD is altogether displayed in the display area PA separate from the figure and its correspondence to the interval data and the apex data is clearly expressed by putting the same number as the interval data and the apex data. Here, in order to have the display more easily comprehensible, the interval data AD and the number are connected by an extension line and the parameter data PD is indicated by a table. If the capacity of the parameter display area PA is insufficient, only its part is displayed while the others are displayed by scrolling by moving the display position by instruction.

Figure 25:
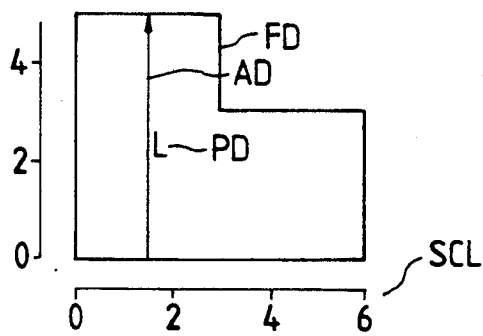
FIG. 25 shows an example where the interval data represents not only that the distance between two sides or two points is variable but also that the data represents the interval from one of them to the other with the one being reference.

FIG. 25 shows the example where the interval data represents not only that the distance between two sides (points) is variable but also the distance from one of them to the other with the former being the reference. Here, the base of the arrow is the reference and its tip is movable. A scale SCL is prepared with the figure so that the coordinates of the fixed portion can be determined by this scale.

Figure 26:
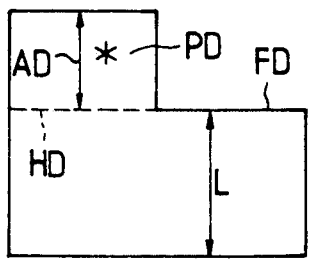
FIG. 26 shows an example where the parameter data of all the interval data are not designated by formulas but symbols meaning merely that the portion which can be determined automatically is merely variable, on the contrary, is put.

FIG. 26 shows the example where the statement of the formula expressing the parameter is omitted by putting the symbol (* in the drawing) meaning that the portion which can be determined automatically by the values of the other parameter data is merely variable, instead of designating the parameter data of all the interval data AD by the formulas.

Figure 27:
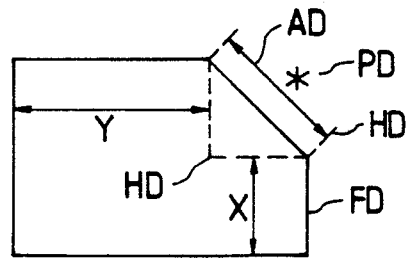
FIG. 27 shows an example where the interval data of the variable portion can be determined automatically by a plurality of parameters.
Figure 28:
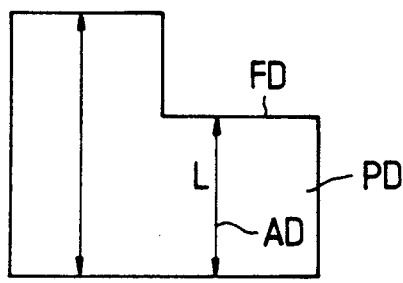
FIG. 28 shows an example where designation is made so as not to make the internal between two sides or two points variable by not describing the parameter data for the interval data.

FIG. 27 shows the example where the statement of the formula expressing the parameter is omitted by putting the * mark when the interval data of the variable portion can be determined automatically by a plurality of parameters and FIG. 28 shows the example where the interval between the two sides (points) is not variable by not describing the parameter data to the interval data. In this case, the interval is determined from the graphic data and that value is used as the value of the interval data.

Figure 29:
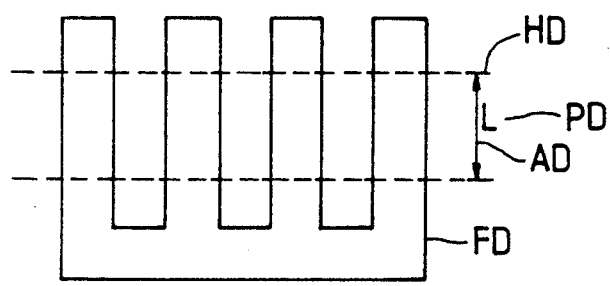
FIG. 29 shows an example where auxiliary lines are used in order to designate part of a side.
Figure 30:
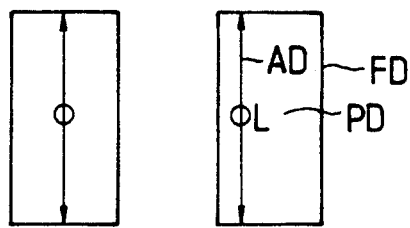
FIG. 30 shows an example where the same symbol is put to a plurality of interval data so that they are the interval data representing the same length.

FIG. 29 shows the example where the auxiliary line HD is not the extension of the side but an auxiliary line is used in order to designate part of the side. In this case, the interval between the points of intersection of the auxiliary data HD and the graphic data FD are designated by the parameter data. FIG. 30 shows the example where the same symbol (circle ◯ in the drawing) is put to a plurality of interval data so that they are the interval data having the same length.

Figure 31:
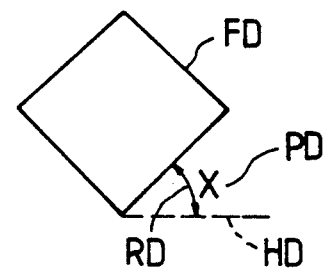
FIG. 31 shows an example where angle data are used in order to make an angle parametric.

FIG. 31 shows the example where the angle data RD is used in order to render the angle parametric. A symbol such as an arrow is used for the angle data RD and the angle between the sides or auxiliary lines with which both ends of the arrow come into contact is the data expressed by the corresponding parameter data PD.

Figure 32:
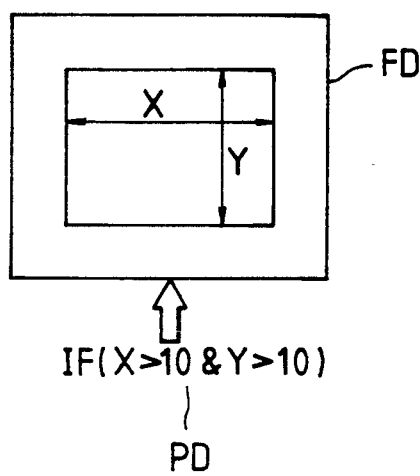
FIG. 32 shows an example where the condition under which the graphic data are arranged is expressed by parameters.

FIG. 32 shows the example where the condition of the arrangement of the graphic data FD is expressed by the parameter. If the conditional formula of the parameter can be established, the figure exists and if it cannot, the figure is not displayed.

Figure 33:
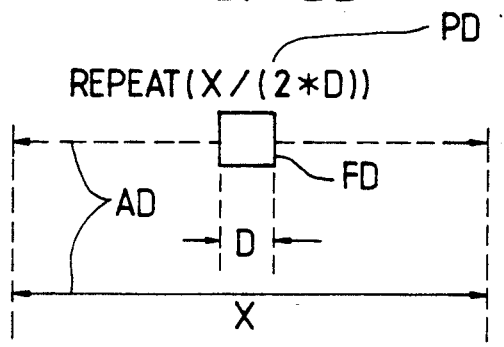
FIG. 33 shows an example where repetition of a figure is converted to parameters and is then displayed.

FIG. 33 shows the example where repeated display of the figure is rendered to parameters and this represents that the same figure is displayed repeatedly in the same pitch (D) and in the number represented by the parameter data (formula X/(2*D)) to the portion represented by the interval data AD.

Figure 34:
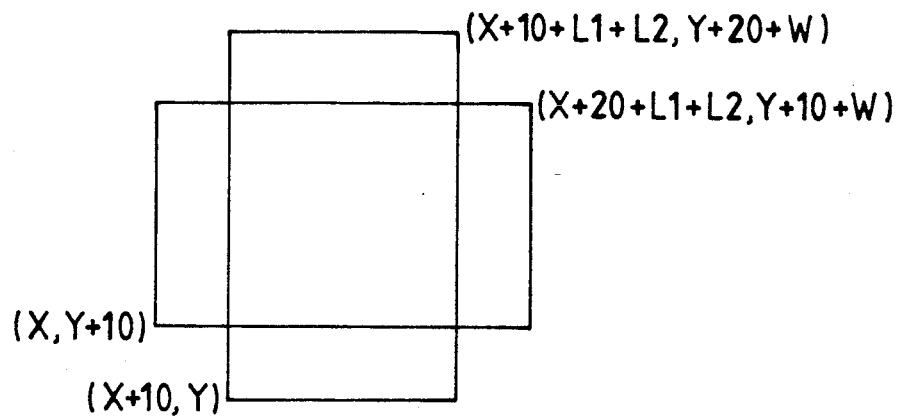
FIG. 34 shows an image diagram of a figure expressed by a conventional display method of a parametric figure.

FIG. 34 is an image diagram showing the example of the figure expressed by the conventional display method of the parametric figure.

As described above, the embodiment of the invention displays or compiles the typical examples of the parametric figures as the object of display as the basic figures on the display surface and puts the symbol representing the variable distance such as the arrow and the variable (parameter data) and the formula between the side and another side or between the point and another point whose interval is desired to be made variable among these basic figures. The embodiment puts also the symbol such as X and the parameters or formulas representing its coordinates to the apex whose position is desired to be made variable. Accordingly, since the typical examples of the parametric figures as the object of display are displayed by the figures on the display surface, the operator can more easily understand the schematic shape. Furthermore, since the portion to be made variable can be directly displayed by the symbol on the display surface, the shape of the fixed portion and where the variable portion exists can be expressed visually and the operator can more easily image the practical figure.

In addition, since the parametric figure as the object of display is expressed not only by the coordinates of each apex but also by designating the distance between the variable points (sides) on the basic figure, the portion which is moved by the variable but the distance between the points (sides) of which does not change need not be specified so that the display/compilation work can be simplified. When a plurality of portions which are to be made variable are designated, the relative distance between the respective points (sides) is designated so that it is not necessary to use a complicated formula which takes into consideration the relationship between the parameters without being affected by the other variable portions. Moreover, it is not necessary, either, to express the coordinates of all the moving apexes by the formulas and the efficiency of work can therefore be improved.

Although the invention completed by the present inventor has thus been described definitely with reference to the embodiment thereof, the invention is not particularly limited thereto but can of course be changed or modified in various manners without departing from the spirit and scope thereof.

The effect brought forth by the typical embodiment among the embodiments disclosed herein is briefly as follows.

Since the parametric figure is expressed visually, it is more easily understood by the operator and its preparation becomes easier. Accordingly, the number of man-hours necessary for the preparation of the drawing using the parametric figures can be reduced. Since the figures are more easily comprehensible, the mistake in expression can be reduced and reliability of the prepared drawings can be improved.

What we claim is:

1. A graphic processing apparatus comprising:
   an input device for inputting a command from an operator;
   a display device for displaying graphic data; and
   a computer for preparing and correcting the graphic data in response to an input of the command from the operator and for effecting display control of the display device in order to display various revision levels of the graphic data, said computer including means for displaying a figure of a presently requested revision level as a solid line figure, a previously executed figure as a dotted line figure, and symbols and patterns adjacent to the figure of the presently requested revision level on said display device visualizing a content of command processing executed to result in the display of the figure of the presently requested revision level in response to the input command from said input device for showing that the input command is executed to revise the previously executed figure in order to visualize the figure of the presently requested revision level, and for displaying the previously executed figure as the dotted line figure and a symbol adjacent to the dotted line figure for representing that the previously executed figure has been deleted from said display device in response to the input command from said input device when the figure of the presently requested revision level is obtained by deleting the previously executed figure in response to the input command.

2. A graphic processing apparatus according to claim 1, wherein said computer further includes means for displaying as a moving arrow symbol on said display device the command processing content executed in response to the command input to said computer from said input device in such a manner that the length of the arrow symbol is repeatedly changed from zero to a distance corresponding to a distance through which said previously executed figure has been moved.

3. A graphic processing apparatus according to claim 1, wherein said computer comprises means for recording as a command history input data for command processing received from said input device and data existing before and after processing of the graphic data as the object of the command processing and means for displaying symbols and patterns reproducing the state of a figure as the object of command processing which is displayed on said display device before the command processing is executed and the content of the deleted command processing.

4. A graphic processing apparatus according to claim 1, wherein said computer includes means for displaying symbols and patterns on said display device visualizing the command processing content in response to a command input from said input device and for displaying a format example of the command on said display device in association with the visualized command processing content.

5. A graphic processing apparatus comprising:
   an input device for inputting a command from an operator;
   a display device for displaying graphic data; and
   a computer for preparing and correcting the graphic data in response to the input of a command from the operator and for effecting display control of the display device in order to display various revision levels of the graphic data, said computer including means for displaying a previously executed figure which was displayed on said display device before a figure of a presently requested revision level is visualized as a dotted line figure and for displaying a symbol which indicates a content of a command for undo processing of the previously executed figure on said display device in response to the input command from said input device when the figure of the presently requested revision level is obtained by executing an undo processing of the previously executed figure in response to the input command.

6. A graphic display and compilation apparatus, comprising:
   a display device;
   an input device for inputting data and commands; and
   operation control means for effecting display control of graphic data including a plurality of graphic figures for display by said display device and for changing said graphic data in response to a command, including means for determining the position, interval, apexes and length of the sides of said graphic figures by means of parameters or calculation formula using the parameters, means for providing data of a basic figure as a reference for said graphic figures and for displaying said data on said display device, means for generating a parametric figure by adding to said data of a basic figure parameters and data values expressing an interval between two points which are to be made variable and data coordinate positions and for adding to said data of a basic figure parameters as variables relating to values of the interval and the data coordinate positions in the display of said basic figure on said display device, and means for varying at least one of said position, interval, apex and length of the sides of all of said plurality of graphic figures by a command input by said input device which commands change of at least one of said position, interval, apex and length of a side of said parametric figure.

7. A graphic display and compilation apparatus according to claim 6, wherein said operation control means further comprises means for drawing auxiliary lines on said basic figure displayed on said display device on the basis of the command inputted from said input device to said operation control means and for displaying parameter data and values expressing said interval as variables in association with the auxiliary lines.

8. A graphic display and compilation apparatus according to claim 7, wherein said graphic figures are displayed using data of said basic figure for determining any parameters and data values of position, interval, apex and length of said graphic figures not added to said data of a basic figure in generating said parametric figure.

9. A graphic display and compilation apparatus according to claim 6, wherein said graphic figures are displayed using data of said basic figure for determining any parameters and data values of position, interval, apex and length of said graphic figures not added to said data of a basic figure in generating said parametric figure.

10. A graphic display and compilation apparatus, comprising:
   a display device;
   an input device for inputting data and commands; and
   operation control means for effecting display control of graphic data including a plurality of graphic figures for display by said display device and for changing said graphic data in response to a command, including means for determining the position, interval, apexes and length of the sides of said graphic figures by means of parameters or calculation formula using the parameters, means for providing data of a basic figure as a reference for said graphic figures and for displaying said data on said display device, means for generating a parametric figure by adding to said data of a basic figure calculation formulas representing symbols and data values expressing an interval between two sides which are to be made variable and data coordinate positions and for adding to said data of a basic figure calculation formulas as variables relating to values of the interval and the data coordinate positions in the display of said basic figure on said display device, and means for varying at least one of said position, interval, apex and length of the sides of all of said plurality of graphic figures in response to a command input by said input device which commands change of at least one of said position, interval, apex and length of a side of said parametric figure.

11. A graphic display and compilation apparatus according to claim 10, wherein said operation control means further comprises means for drawing auxiliary lines on said basic figure displayed on said display device based on the command inputted from said input device to said operation control means and for displaying calculation formulas representing symbols and values expressing said coordinate positions as variables in association with the auxiliary lines.

12. A graphic display and compilation apparatus according to claim 11, wherein said graphic figures are displayed using data of said basic figure for determining parameters and data values of position, interval, apex and length of said graphic figures not obtainable from a calculation formula added to said data of a basic figure in generating said parametric figure.

13. A graphic display and compilation apparatus according to claim 10, wherein said graphic figures are displayed using data of said basic figure for determining parameters and data values of position, interval, apex and length of said graphic figures not obtainable from a calculation formula added to said data of a basic figure in generating said parametric figure.

* * * * *